United States Patent [19]

Eichenlaub

[11] Patent Number: 5,040,878
[45] Date of Patent: Aug. 20, 1991

[54] ILLUMINATION FOR TRANSMISSIVE DISPLAYS

[75] Inventor: Jesse B. Eichenlaub, Rochester, N.Y.
[73] Assignee: Dimension Technologies, Inc., Rochester, N.Y.
[21] Appl. No.: 471,926
[22] Filed: Jan. 26, 1990
[51] Int. Cl.$^5$ .............................................. G02F 1/133
[52] U.S. Cl. .................................. 350/345; 350/338; 362/31
[58] Field of Search .................. 350/345, 338; 362/31, 362/222, 223, 225, 247, 293, 296, 307

[56] References Cited

U.S. PATENT DOCUMENTS

| | | | |
|---|---|---|---|
| 4,186,431 | 1/1980 | Engel et al. | 362/223 |
| 4,717,949 | 1/1988 | Eichenlaub | 350/131 |
| 4,737,896 | 4/1988 | Mochizuki et al. | 350/345 |
| 4,798,448 | 1/1989 | van Raalte | 350/345 |
| 4,822,145 | 4/1989 | Staelin | 350/345 |
| 4,829,365 | 5/1989 | Eichenlaub | 350/131 |
| 4,874,228 | 10/1989 | Aho et al. | 350/345 |

FOREIGN PATENT DOCUMENTS 0107618  6/1985  Japan ................................. 350/345

Primary Examiner—Stanley D. Miller
Assistant Examiner—Anita Pellman Gross
Attorney, Agent, or Firm—Robert M. Phipps

[57] ABSTRACT

Illumination is provided for transmissive displays by the combination of (a) a light source which emits a thin, straight line of light, (b) cylindrical lens in front of the line of light and (c) a reflecting panel having (i) a first transparent layer which has spaced ridges on the side next to the light, (ii) an optional translucent diffusing layer next to the smooth, away from the light, side of the first layer and (iii) a third layer which is transparent and structurally stable that is attached to the second side of the translucent layer.

24 Claims, 4 Drawing Sheets

ILLUMINATION FOR TRANSMISSIVE DISPLAYS

BACKGROUND

1. Field of the Invention

This invention relates to flat screen autostereoscopic displays, back light illumination devices for autostereoscopic displays, and back light illumination devices for transmissive displays in general.

2. Prior Art

My previous U.S. Pat. Nos. 4,717,949 and 4,829,365 described autostereoscopic display devices that use thin, vertical, parallel light emitting lines behind a transmissive electronic display, such as an LCD display, in order to create stereoscopic images. There are many possible ways to create the thin vertical lines. Some methods are described briefly in U.S. Pat. No. 4,717,949. These methods vary in cost and complexity. It is necessary for commercial applications to use a method of producing bright, thin light emitting lines that is cost effective and easy to implement.

It is therefore an object of this invention to provide a simple, easy to construct, and cost effective means of producing thin, bright, parallel light emitting lines for use in an autostereoscopic display with illuminating lines and light valve.

It is also an object of this invention to produce a versatile illumination system that will allow a user to use a transmissive display in autostereoscopic mode and also be able to switch to traditional even rear illumination in order to use the display in full resolution two dimension (2-D) mode.

Still another object of this invention to provide an illumination system that can produce brighter back lighting for transmissive displays in general than can currently be produced by other common low power back lighting technologies. It is further an object of this invention to provide an illumination system for a transmissive display that increases the apparent contrast of the display by a factor of almost 2.

Yet another an object of this invention to provide a versatile illumination system that can rapidly change the color of the illumination source between three colors such as red, blue and green, and which can be synchronized with a transmissive display to provide full color, full resolution images. Still other objects will be apparent to those skilled in the art upon reference to the following detailed description and claims.

SUMMARY OF THE INVENTION

In accordance with this invention there is provided a transmissive display unit with an illumination system the improvement in combination therewith comprises:
A. A bright, straight light emitting source,
B. A lens of roughly the same length as the light emitting source and situated one focal length or more from the light emitting source, with its long axis parallel to the light emitting source (so that it collimates or focuses the light and causes the light to be cast across a flat surface), and
C. A reflector plate or panel consisting of a transparent flat rectangular plate oriented with one side parallel to the light emitting source, with its surface making an angle of a few degrees with an imaginary line perpendicular to the light source and passing through the optical axis of the cylindrical lens, and possessing the following layers:

1. A thin transparent layer on the side or surface closest to the cylindrical lens and light source, said layer being transparent and possessing a number of small parallel shaped ridges which are parallel to each another and to the straight light emitting source, and shaped in such a way as to reflect light entering them from the light source into the plate, in a direction being roughly perpendicular to the surface of the reflector plate,
2. A transparent glass layer attached to the first transparent layer on the side opposite the ridges, said glass layer having sufficient thickness to provide structural stability and hold itself and the other layers flat, and
3. Optionally a thin translucent diffusing layer inserted between and attached to the first transparent layer on the side opposite the ridges and the glass layer, said diffusing layer possessing sufficient diffusing properties to cause the direction of travel of light passing through it to be spread over a wide angle.

DESCRIPTION OF THE PREFERRED EMBODIMENTS

Figure 1:
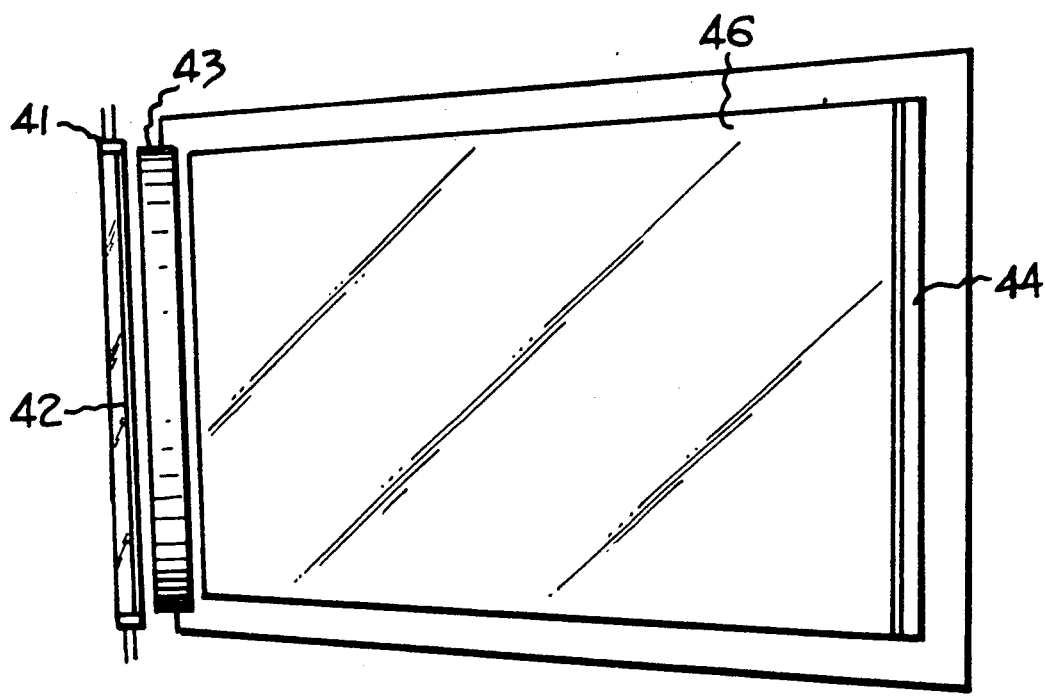
FIG. 1 is a perspective view of the illumination system with a three dimensional (3-D) display of this invention.

The basic transmissive display of this invention has an improved illumination system which comprises:
A. A bright, straight light emitting source, e.g. lamp 41,
B. A lens 43, and
C. A reflector plate or panel 46 possessing three layers:
1. A first layer 47 of a thin transparent layer with spaced ridges on the side closest to the lens and light source,
2. An optional second layer 48 which is a thin transluscent diffusing layer attached to the first layer 47 on the side opposite the ridges, and
3. A third layer 49 which is a transparent structural layer on the second side of the diffusing layer 48,
as described in more detail elsewhere. In the more preferred embodiments the illumination system also includes:
D. Spacers and mountings necessary to hold the light emitting source, cylindrical lens, and reflector plate in position with respect to one another, and to hold the reflector plate at the proper distance from and parallel to a flat transmissive display, such as an LCD,
E. Means of rapidly changing the color of the light emitted from the light source between the three primary colors, these colors generally being recognized as red, green and blue, F. Means of synchronizing the transmissive display with the changing colors of the light source, so that it displays red, green and blue color components of an image during the periods when the light source emits these respective colors, and G. Means of turning off the illumination from the straight light emitting source and turning on a source of even illumination across a surface situated behind the reflector plate and roughly parallel to it.

The illumination system for an autostereoscopic display of the type described in U.S. Pat. No. 4,717,949 has 2 sub systems: the 2-D illumination system and the 3-D illumination system. The two systems are shown in FIG. 1.

In FIG. 1, a bright fluorescent aperture lamp 41 which lacks a phosphor coating along a thin aperture 42 running parallel to its length, is used as a light source. These lamps are easily made and common, being used in such devices as copiers and as sources of directed lighting for static displays. The lamp source may also be a line of fiber optic strands placed side by side or an incandescent light bulb.

Light exiting the lamp aperture 42 is focused by a lens 43 situated one focal length or more from the line. A holder 44 can be used to hold the lens 43 and aperture lamp 41 in position relative to one another. The preferred lens is cylindrical and extends in length along the entire line of light. Alternatively, the cylindrical lens 43 may be substituted by a row of square convex lens, the length of the row of square lenses being equal to the length of the line of light focused by the cylindrical lens 43.

Other devices that emit bright light along a thin line can be used in place of the aperture lamp. Examples include specialty single filament incandescent lamps with filaments that do not warp when they are turned on, such as those made by the Gilway Technical Lamp Co., Thin Film Electroluminescent edge emitters, fiber optic line converters, linear flash (including strobe) lamps and a variety of bright lamps shining through a slit.

Figure 2:
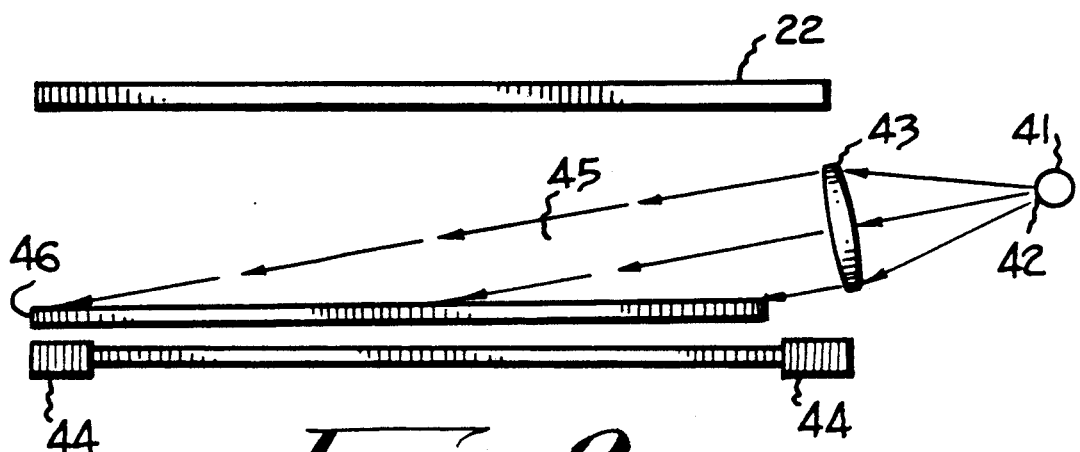
FIG. 2 is a top view of the illumination system of FIG. 1.

The collimated light forms a narrow shaft of light, or light beam, 45 in FIG. 2. The cylindrical lens 43 and aperture lamp 41 are angled with respect to a flat rectangular reflector plate 46 in such a manner that the shaft of light coming out of cylindrical lens 43 falls across the entire rear surface of reflector plate 46, as shown in FIG. 2.

Figure 3:
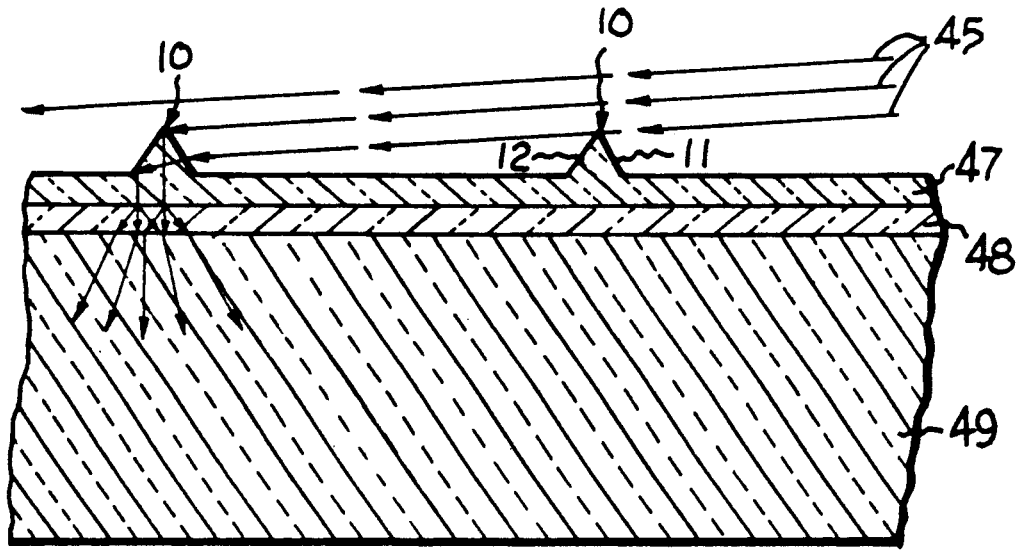
FIG. 3 is an enlarged top view of a section of the reflector plate of FIGS. 1 and 2.

A magnified view of a cross section of reflector plate 46 is shown in FIG. 3. The plate is made up of three layers 47, 48, 49. The first layer 47 on the side that the light from the cylindrical lens falls on to, is very thin, generally no more than 0.1 mm thick and is transparent. Typically the first layer 47 is made from a plastic material that can be cured (or cross linked) at room temperature to avoid shrinkage and warping. A typical plastic composition would be an ultraviolet ray curable potting composition e.g., an epoxy potting composition. This layer possesses a large number of v shaped ridges, 10, on its back surface, running parallel to the short (vertical) side and to the light emitting source and the cylindrical lens. The spacing of the ridges on layer or plate 47 is determined by the spacing formula $$s = [an(d+m)]/d$$

wherein m = the distance from screen to light valve n = the width of a single pixel on the light valve d = the distance along the normal between the light valve and the line a = the number of columns of pixels for each light site (either 1 for a single column or 2 or more for two or more pairs of columns present).

Each ridge 10 possesses two flat sides 11, 12 one of which faces the illuminating line and the other of which faces away from the illuminating line. The ridges are usually symmetrical, with both sides making the same angle with the reflector plate surface. The angles are such that light entering the ridges on first sides 11 is reflected off of second sides 12 due to total internal reflection, and exits the ridge in a direction into the plate and perpendicular to the reflector plate surface, as shown in FIG. 3.

The height of the ridges is such that, when the collimated light from lines 45 falls across the ridge 10 at the proper angle, then the light that misses the first ridge 10, by passing over it goes on and enters the second ridge 10, and so on across the reflector plate 46, so that nearly all the light falling on plate 46 enters the ridges 10. The proper height for the ridges 10 is typically around 1/500th inch (2 mils) (0.05 mm).

A thin layer of diffusing material 48 is placed directly in front of the ridged layer as shown in FIG. 3. The diffusing layer should generally be only a fraction of a millimeter thick. The diffusing material should be of the type that achieves diffusion by means of tiny particles suspended in a medium, such as an acrylic composition. Such diffusion layers can be obtained from several suppliers in the United States.

Light passing through the diffusing layer 48 is spread out, so that it exits the diffusion layer with directions of travel spread across a wide angle. An observer in front of reflector plate 46 sees a large number of thin bright lines on diffusion layer 48, one in front of each ridge, and furthermore the observer can see the lines from wide angles to the normal of reflector plate 46. In some applications the diffusing layer 48 may be omitted. This omission will result in very bright directional beams of light from each ridge 10, 13 that can only be seen from a narrow viewing angle in front of each ridge 10, 13. The preferred and more ordinary construction on the reflector panel 46 of this invention utilizes the diffusing layer 48.

Diffusion layer 48 is deposited on the third layer 49 which is the structural support member of the reflector plate 46. The third layer 49 is a piece of smooth, flat, hard transparent material, such as float glass, which provides structural stability to the reflector plate. If made from glass, this layer 49 should be at least 3 mm thick. Light finally exits from this layer where it is spread out even further, again as shown in FIG. 3, since it is exiting from a medium (glass or plastic) with a higher index of refraction than air. The observer in front of reflector plate 46 sees a large number of thin, bright lines formed by the ridges on the diffusion layer 48.

Figure 4:
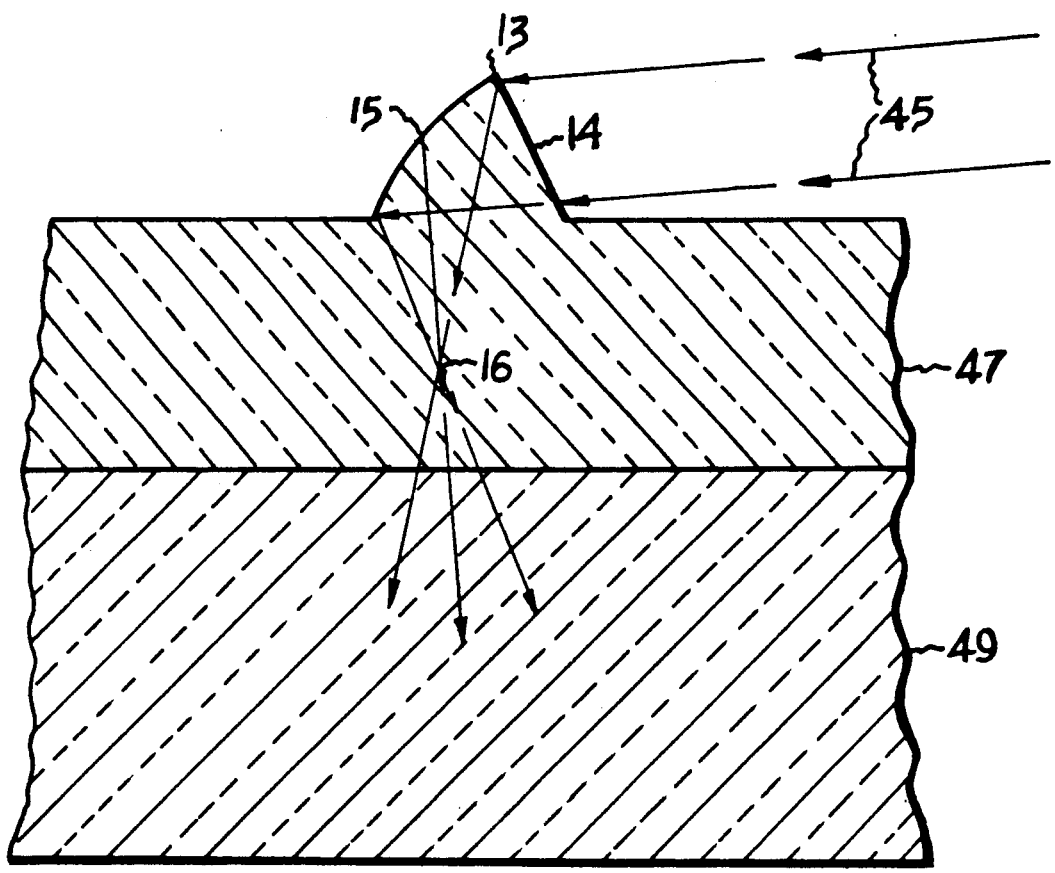
FIG. 4 illustrates an alternative ridge shape of the reflector plate of FIG. 3.

FIG. 4 illustrates an alternative ridge shape that can be used to spread the light out and avoid the use of the diffuser. In this configuration, each ridge 13 possesses a flat side 14 which faces the lamp 41 and cylindrical lens 43 and a convex curved surface 15 which faces away from the cylindrical lens 43 and lamp 41. The cylindrical lens 43 in this case should be placed one focal length from the illuminating line to provide even illumination.

The opposite side of the ridge 15 is curved and is angled so that all of the light from lamp 41 entering flat side 14 is reflected by curved surface 15 due to total internal reflection. Since surface 15 is curved, the collimated light is also focused into a narrow area 16 in front of the ridge, forming a crude image of line 5 at that point, and then spreads out across a wide angle. This angle should typically be about 40 degrees, which means that the curved surface 15 should subtend an arc of about 20 degrees. Surfaces 15 may be aspherical in shape to evenly distribute light across the reflected angle.

The light from each ridge 10, 13 in either of the above configurations proceeds to pass through the transmissive image forming surface 44, FIG. 1, which is typically an LCD display. If the observer is situated at the correct distance from the display, and directly in front of it, he or she will see stereoscopic images according to the principles noted above.

The illumination systems described above can also be used as back lighters for 3-D still images on photographic film or a similar medium. A transmissive display can be replaced by a hard copy emulsion possessing left and right eye strip images in place of the pixel columns containing left and right eye views on the transmissive display, which are further described in U.S. Pat. No. 4,717,949.

The illumination system described above can be used to produce a color image on transmissive display 44 if the light emitting line 5, such as from aperture lamp 41 is caused to emit red light, green light, and blue light in rapid succession, and to repeat this process with a 1/30th second period (or less) for each red, green, and blue cycle to be completed.

Figure 5:
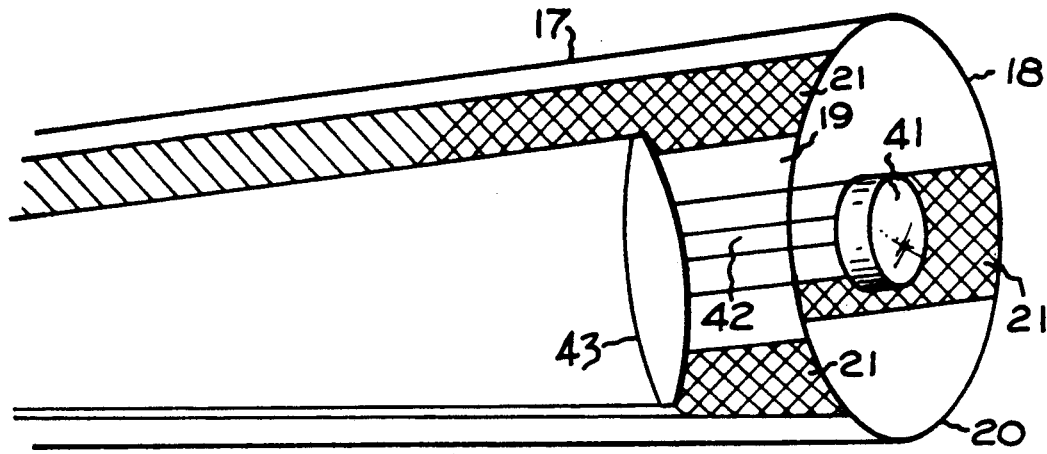
FIG. 5 illustrates an arrangement of illumination sources to change the color of the light emitted very rapidly between 3 colors.

FIG. 5 illustrates a method of producing the red, blue, and green flashing sequence by filtering. A rotating filter drum 17 with alternating transparent stripes red 18 green 19 and blue 20 is placed around the lamp 41. Opaque areas 21 are placed in the drum between the colored stripes 18, 19, 20 of the filter drum 17. the light from lamp 41 passes through the colored stripes 18, 19, 20 in front of the lamp aperture 42 and passes through the cylindrical lens 43 on to the reflector plate (not shown). These and many other methods of changing the color of light emitted by a source are well known in the arts of illumination and filtering.

The rotating filter drum 17 may be used as a substitute for the lamp 41 shown in FIG. 1. Electronic means is provided to synchronize the color changing lamp drum 17 with transmissive display (not shown) so that when red light 18 is emitted, the red color component of an image or images is displayed on display 44, when the light is green 19, the green component of an image is displayed on display 44, and when the light is blue 20 the blue component of an image is displayed on display 44. The changes between image components during which a new image is formed on the display occur during the time that the opaque areas 21 block out the light from the lamp 41. The display changes from one image to the next while the opaque areas 21 on the drum 17 block light from the lamp 41. The drum 17 should be made to rotate fast enough to cause one set of red, green, and blue stripes to pass in front of the lamp every 1/30th second. Thus, over the 1/30th second cycle, an observer will see a full resolution color image made from its red, green and blue components.

It is possible to use a different version of reflector plate for two dimensional illumination. The number of ridges on the plate is doubled, and the spacing between them halved, so that an observer in front of the display sees a bright line situated behind each pixel column with both of his or her eyes. Thus, with such a reflector plate, the observer can see only two dimensional (2-D) images. This illuminator can also use the three color flashing technique described above to provide full resolution, full color images on a 2-D display.

The use of bright lines with dark space between them also has a positive effect on the perceived contrast of the display when used in 2-D or 3-D modes, at least for lower resolution displays in which the individual pixels can be perceived by the eye. Since each bright area on the image is surrounded by a very black area, the perceived contrast between the light areas and dark areas on the image is increased. This will be true regardless of the particular shape of the light emitting regions behind the display, as long as a considerable amount of black area exists between the light emitting regions, so this feature can be considered an advantage of all the different shaped illumination sources discussed.

It is desirable in many situations to be able to display conventional 2-D images or text in full resolution in addition to displaying 3-D images with half the pixel columns seen by each eye. The present invention allows for an easy method of changing the screen from 2-D to 3-D by merely changing the illumination between a uniform rear illumination source for 2-D and the bright light lines for 3-D. This is illustrated in FIG. 2.

In FIG. 2, an electroluminescent (EL) panel 22 which glows when high frequency alternating electrical potential is placed across it, may be placed in the position shown, far enough behind the reflector plate 48 so that it does not block the shaft of light 45 coming from cylindrical lens 43. A switch and electrical connections must be provided to turn off lamp 41 and turn on EL panel 22.

Other methods of providing even rear illumination for transmissive displays 39 are well known to the art. Some examples include florescent bulbs at the top and bottom of display 12 that cast their light onto a white surface in the same position as EL panel 18, or onto a diffusing layer 8 or 29, banks of fluorescent bulbs placed behind display 12, and woven mats of fiber optic strands. In any of these cases, a switch can be provided on the display to simultaneously turn off the 3-D light source(s) and turn on the 2-D light source(s).

Figure 8:
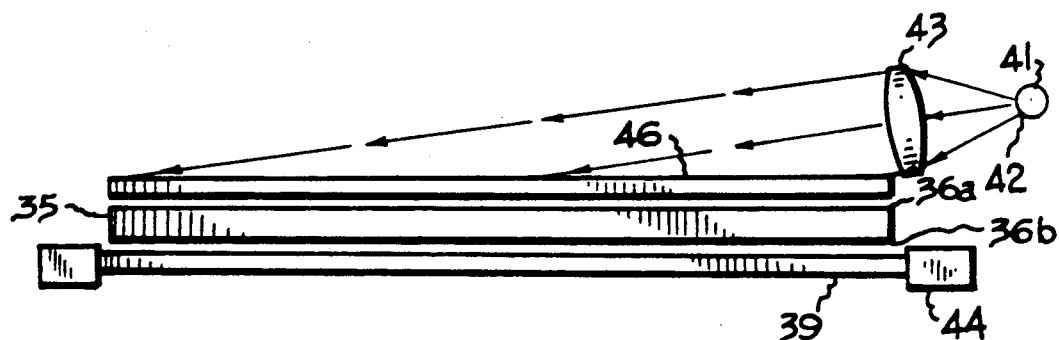
FIG. 8 is an alternative means of illuminating two dimensional displays.

FIG. 8 illustrates an alternative way to provide 2-D illumination. A layer of smectic LC (Liquid Crystal) material 35 is sandwiched between two electrode layers 36a, 36b is placed between the reflector plate 46 and the transmissive display 39. This LC material lets light pass through it undisturbed when an electrical voltage is applied across the material, but it scatters light when the electricity is turned off. For 3-D viewing, the electric current across the smectic LC layer 35 is turned on, allowing the viewer to see the bright lines cast by reflector plate 46. For 2-D viewing, the electric current across smectic layer 35 is turned off, so that the layer scatters the light from the lines. The observer then sees uniform illumination across smectic layer 35, and sees all of the pixels in the transmissive display 39 with both eyes, allowing the observer to comfortably see full resolution 2-D images.

By using the arrangement shown in FIG. 8, it is possible to use the alternating primary colors, e.g., red, green and blue color illumination arrangement, illustrated in FIG. 5, for 2-D viewing and well as 3-D viewing.

A similar reflector plate and lamp configuration can be used to provide two sets of blinking lines in order to provide full resolution for each eye when viewing in 3-D. A method of presenting full resolution to each eye in 3-D mode is by means of two sets of blinking lines. This may be achieved with an electronic display unit for autostereoscopic viewing or two dimensional high resolution viewing having (a) a surface that is capable of emitting light from two or more sets of sites, (b) means of causing each set to blink on and then off in succession, one set after the other, and to repeat this process continuously whenever the unit is turned on and (c) a light valve in front of and parallel to said surface, said light valve having individual picture elements on its surface, the light valve being capable of displaying a different set of images every time a different set of light emitting sites flash on.

Figure 6:
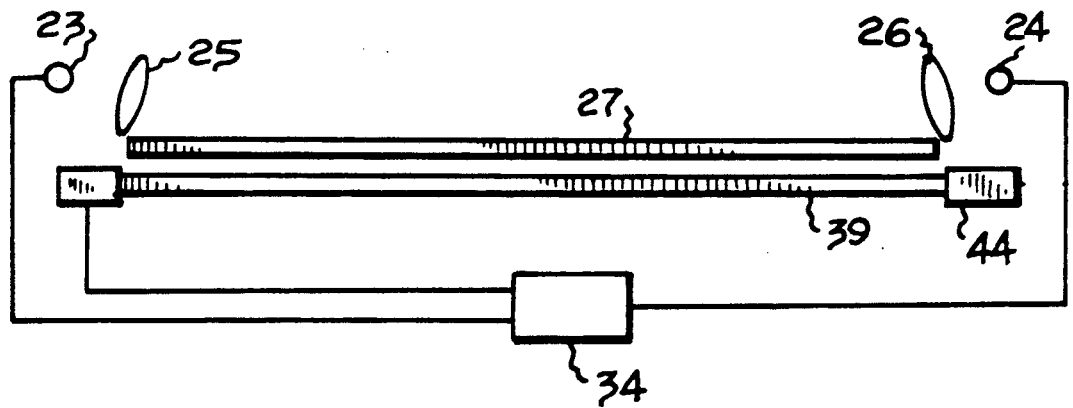
FIG. 6 is a top view of an alternative illumination system that can produce two sets of blinking lines.
Figure 7:
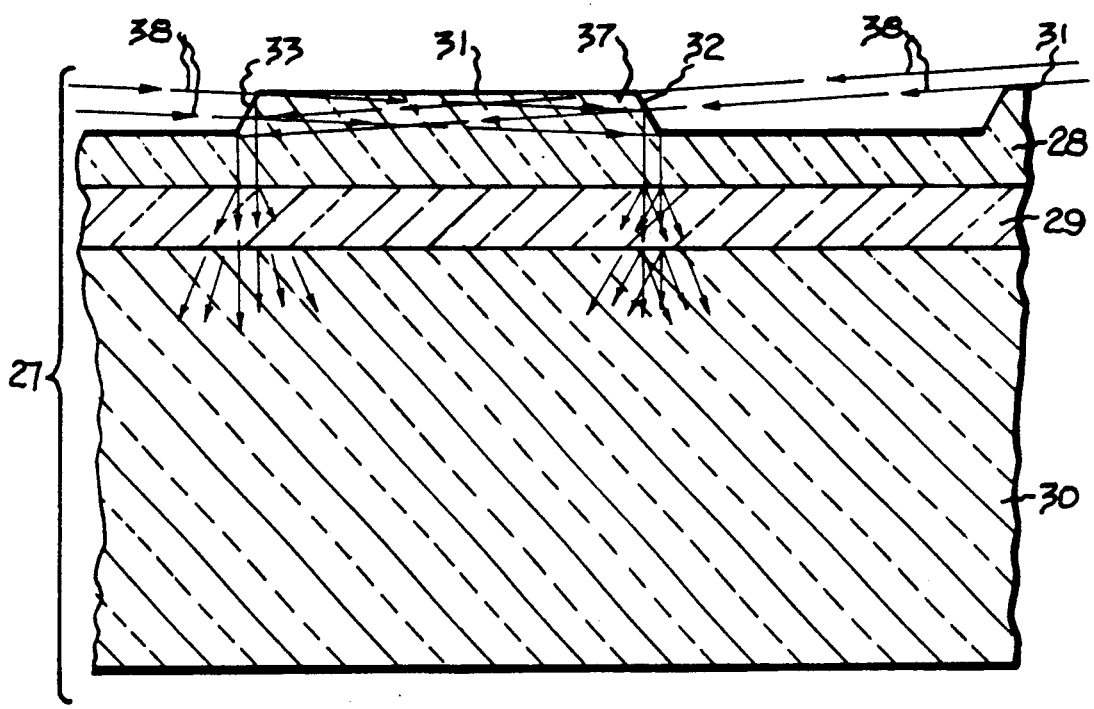
FIG. 7 is an enlarged top view of the reflector plate shown in FIG. 6.

This configuration is illustrated in FIGS. 6 and 7. In FIG. 6 two lamps 23, 24 are shown at each side of a reflector plate 27. These lamps 23, 24 are parallel to the sides of plate 27 and in line with each other. Lenses are placed in front of and parallel to the lamps. The lamps alternate in casting bursts of light across the reflector panel. In FIG. 8 cylindrical lenses 25, 26 are placed in front of the lamps 23, 24 and are parallel to them. The lamps 23, 24 should be of the linear strobe lamp type that are designed for repetitive flashing of very short bursts of light. Lamps 23, 24 are caused to alternately flash on and off, so that lamp 23 flashes on while lamp 24 is off, and visa versa. The flashing rate should be steady, with an equal amount of time, generally no more than 1/60th second, between flashes. The flashing is controlled by s synchronizer 34 which also synchronizes the display of images on transmissive display 44.

The construction of reflector plate 27, is nearly identical to that of reflector plate 46 shown in FIG. 7. As before, three layers are used, a transparent ridged layer 28, a diffusion layer 29, and a transparent substrate 30. The main difference in plate 27 is the ridge shape 37. As shown in FIG. 7, each ridge is much wider than previously and each has a flat top 31. As before, the ridges are vertical and parallel to the lamps 23, 24 and to each other. The two sides 32, 33 of the ridges 37 are flat, and can make the same angle with the reflector plate surface as the ridge sides 11, 12 in FIG. 2—about 52 degrees. Light rays 38 from lamp 24 enter the ridges 37 through sides 32, and are reflected into the reflector plate 27 by sides 33 due to total internal reflection, as shown in FIG. 7. As before, the light strikes diffusion layer 29 and its direction of travel is spread through an angle. Light rays 38 from lamp 23 enter sides 33 and are reflected into reflector plate 27 by sides 32. They too pass through diffusion layer 29. As the lamps 23, 24 alternately flash, two sets of alternately flashing lines of light are thus created on diffusion layer 29.

The tops 31 of ridges 37 may be blackened in order to prevent light from entering them at places other than the flat sides 32, 33 and to prevent light from reflecting off the tops 31 and scattering within the display.

The foregoing configurations and methods have been described in the foregoing specification for the purpose of illustration and not limitation. Many other modifications and ramifications will naturally suggests themselves to those skilled in the art based on this disclosure. These are intended to be comprehended as within the scope of this invention.

The embodiments of the invention in which an exclusive property or privilege is claimed are defined as follows:

1. An illumination device for transmissive displays consisting of:
   A. a light source which emits light from a thin, straight line,
   B. a lens placed in front of said light line, with its long axis parallel to said light emitting line, so that it collimates the light and causes it to be cast across a flat reflecting panel, and
   C. a flat reflecting panel which is an integral unit of rectangular shape, situated parallel to and close to the image forming surface of the display and possessing the following layers:
   (1) a first layer, on the side nearest the lamp, across which light is cast, being a thin transparent layer possessing a large number of thin, parallel ridges on one surface, with comparatively wide flat space between each of said ridges, such ridges shaped so that light from the light source entering the side of the ridge facing the light source is reflected by the opposite ridge side in a direction perpendicular to the panel and into the panel,
   (2) a transparent glass layer attached to the first transparent layer on the side opposite the ridges, said glass layer having sufficient thickness to provide structural stability and hold itself and the other layers flat, and
   (3) optionally a thin translucent diffusing layer inserted between and attached to the first transparent layer on the side opposite the ridges and the glass layer, said diffusing layer possessing sufficient diffusing properties to cause the direction of travel of light passing through it to be spread over a wide angle, said diffusing layer and said ridge layer being thin enough so that light exiting each ridge is cast through the diffusing layer only along a thin line directly in front of each ridge, said line having a width comparable to the width of the ridge, with the surface of the diffuser between the lines remaining unilluminated.

2. The device of claim 1 wherein the sides of the ridges on said first layer are flat.

3. The device of claim 1 wherein the side of the ridges on said first layer that reflects the light is curved in order to spread the path of the reflected light across an angle.

4. The device of claim 1 wherein the light source is a line of fiber optic strand ends.

5. The device of claim 1 wherein the light source is a fluorescent aperture bulb.

6. The device of claim 1 wherein the light source is a flash lamp.

7. The device of claim 1 wherein a source of even illumination across a surface to the side of the transmissive image forming device opposite the observer is provided.

8. The device of claim 7 wherein the even illumination is provided by means of a linear light source situated behind and to the top or bottom of the reflector panel, said light source casting light across the diffusion layer between the transmissive layers of the reflector panel.

9. The device of claim 7 having means to turn off the linear light source and simultaneously turn on the source of even illumination.

10. The device of claim 7 wherein the even illumination is provided by a layer of smectic LCD material that scatters light when no electricity is placed across it, and does not scatter light significantly when voltage is placed across it and is placed between the reflector panel and the transmissive display.

11. The device of claim 10 wherein means are provided to turn the voltage across the smectic LCD layer on and off.

12. The device of claim 11 wherein light falling across the reflector panel surface is caused to change rapidly between three colors.

13. The device of claim 1 wherein light falling across the reflector panel surface is caused to change rapidly between three colors.

14. The device of claim 13 wherein the three colors or red, green, and blue.

15. The device of claim 13 wherein the color change is accomplished by means of a rotating drum around the linear light source, said drum possessing transparent colored stripes of colors spaced with opaque stripes between each of said colored stripes.

16. The device of claim 13 wherein a synchronizing device causes the transmissive display to display the red component of an image when red light is shining through it, the green component of an image when green light is shining through it, and the blue component of an image when blue light is shining through it.

17. The device of claim 1 wherein the lens is a row of square convex lenses, the row of said lenses being equal in length to the length of said light line.

18. The device of claim 1 wherein the lens is cylindrical.

19. The device of claim 1 wherein the diffusing layer is present within the reflector panel between the ridge layer and the glass layer.

20. The device of claim 19 wherein the sides of the ridges on said first layer are flat.

21. The device of claim 19 wherein the lens is cylindrical.

22. The device of claim 1 wherein an additional linear light source and cylindrical lens is present on the side of the reflector panel opposite the first light source and lens.

23. The device of claim 22 wherein a synchronizing device is used to cause the two lamps to alternatively cast across the reflector panel, and which causes the image on the display to change between the bursts of light.

24. The device of claim 23 wherein the lamps are linear flash lamps which alternatingly flash on and off.

* * * * *